US009222613B2

(12) United States Patent  (10) Patent No.: US 9,222,613 B2
Myers  (45) Date of Patent: Dec. 29, 2015

(54) REMOTE CAMERA AND ADAPTER THEREFOR

(75) Inventor: Darin T. Myers, McKinney, TX (US)

(73) Assignee: ATMOS ENERGY CORPORATION, Dallas, TX (US)

( * ) Notice: Subject to any disclaimer, the term of this patent is extended or adjusted under 35 U.S.C. 154(b) by 534 days.

(21) Appl. No.: 13/591,591

(22) Filed: Aug. 22, 2012

(65) Prior Publication Data

US 2014/0055618 A1  Feb. 27, 2014

(51) Int. Cl.
| G08B 13/196 | (2006.01) |
| F16M 11/32 | (2006.01) |
| F16M 11/20 | (2006.01) |
| F16M 11/14 | (2006.01) |
| F16M 11/42 | (2006.01) |
| G06F 11/22 | (2006.01) |

(52) U.S. Cl.
CPC ............ *F16M 11/2021* (2013.01); *F16M 11/14* (2013.01); *F16M 11/2078* (2013.01); *F16M 11/32* (2013.01); *F16M 11/42* (2013.01); *G06F 11/2294* (2013.01)

(58) Field of Classification Search
CPC .................................................... H04N 7/185
See application file for complete search history.

(56) References Cited

U.S. PATENT DOCUMENTS

| 5,184,601 | A | * | 2/1993 | Putman ......................... 600/102 |
| 7,307,651 | B2 | | 12/2007 | Chew |
| 7,486,183 | B2 | | 2/2009 | Luebke et al. |
| 7,546,019 | B1 | | 6/2009 | Belcher |
| 7,755,668 | B1 | | 7/2010 | Johnston et al. |
| 2004/0148128 | A1 | * | 7/2004 | Kennedy et al. .............. 702/183 |
| 2005/0201744 | A1 | * | 9/2005 | DeSorbo et al. .............. 396/419 |
| 2006/0114987 | A1 | | 6/2006 | Roman |
| 2007/0206090 | A1 | * | 9/2007 | Barraud et al. ............ 348/14.02 |
| 2008/0291260 | A1 | | 11/2008 | Dignan et al. |
| 2009/0033736 | A1 | | 2/2009 | Thomason |
| 2009/0185792 | A1 | | 7/2009 | Braunstein et al. |
| 2009/0322874 | A1 | | 12/2009 | Knutson et al. |
| 2010/0045773 | A1 | | 2/2010 | Ritchey |
| 2011/0012751 | A1 | | 1/2011 | Jones |
| 2011/0134243 | A1 | | 6/2011 | Siann et al. |

FOREIGN PATENT DOCUMENTS

CN  201378849  1/2010

* cited by examiner

*Primary Examiner* — Jefferey Harold
*Assistant Examiner* — Justin Sanders
(74) *Attorney, Agent, or Firm* — Howison & Arnott, LLP

(57) ABSTRACT

An apparatus for deploying a wireless camera includes a mobile cart, a camera and camera support frame, a display/monitor and a display/monitor positioner, an enclosed power supply such as a battery, a removable camera support frame for mounting the camera, a battery box and the display/monitor on the cart and a light for illuminating an area at least partially within the field of view of the camera.

10 Claims, 6 Drawing Sheets

REMOTE CAMERA AND ADAPTER THEREFOR

TECHNICAL FIELD

The disclosure relates to a remote camera, camera adapter and related equipment, and in particular, a camera system for use with a mobile crash cart used for diagnosis and repair of computers and related equipment.

BACKGROUND

In information technology jargon, the term crash cart is used to describe an apparatus that can be connected to a server for the purpose of diagnostics and for identifying and correcting malfunctions that may not or cannot be accessed remotely, or are otherwise not responding. Crash carts typically include a keyboard, a mouse and a monitor since many servers in a modern high-density environment do not have user input/output devices. Crash carts may be used to perform maintenance, run diagnostics and deal with malfunctions of servers at locations remote from a central data processing center or from individuals having specialized knowledge regarding the particular unit being serviced.

Computer servers, often use indicator lights to indicate the status of a machine and/or identify a machine needing attention. Indicator lights, particularly in the case of rack mounted units, provide a simple method to identify one of a number of units having a problem and may provide an indication of the type of problem. Server indicator lights on remotely located units typically cannot be observed from the central data processing center.

Often, a technician working at a remote location will want or need to communicate with the central data processing facility for any one of a number of reasons. As used herein, the terms "central," "local" and "remote" are relative and do not imply any particular physical location. For example, the data processing center may be located in the same building as the remote unit. Alternatively, the remote unit may be located across the country from the data processing center. The technician may be in communication with the central facility via a private network such as a Wide Area Network (WAN), a public network such as the Internet or by phone. In order to facilitate a technician's activities, it may be desirable to have server indicating lights observable from the central facility. Relying only on a camera to transmit server lights to the central facility has several drawbacks; not the least of which is that the technician does not necessarily know what the central facility is seeing. Additionally, since the technician cannot see the image transmitted to the central facility, the technician may have to rely on voice instructions from the central facility to position the camera.

SUMMARY

In one variation, an apparatus for deploying a wireless camera includes a mobile cart having at least four cylindrical, vertically oriented, support members, each of the support members having an upper end and a lower end and a longitudinal axis. A wheel member is connected to the lower end of each of the support members with each wheel member having an axle member having a longitudinal axis around which the wheel member is configured to rotate and wherein the longitudinal axis of each of the wheel members is substantially perpendicular to longitudinal axes of the cylindrical support members. A first platform extends between the vertical support members along a first plane that extends perpendicular to the longitudinal axes of the cylindrical support members. Similarly, a second support platform extends in a second plane between the first support platform and the lower ends of the support members. The first and second support platforms are each affixed to the four vertically oriented cylindrical support members so as to define a hexahedral volume between the first support platform and the second support platform within four vertically oriented, cylindrical support members. The hexahedral volume has rectangular congruent faces coextensive with four planes defined by the longitudinal axes of the vertically oriented cylindrical support members and the two planes defined by the first and second support platforms.

A camera support frame that may be deployed on the cart includes a bracket having a central axis and a plurality of collapsible legs. Each of the legs has a proximal end connected to the bracket with a first articulating joint that permits the leg to be swiveled outwardly from the bracket. Each of the legs also includes a plurality of telescoping sections and lockable joints such that each leg may be extended from a collapsed position wherein the telescoping sections of the leg are retracted and the leg is substantially parallel to the central axis of the bracket to a deployed position. The legs are thus configured to be swiveled outwardly from the central axis and with the telescoping sections of the leg extended and locked with the lockable joints. In the extended, deployed position, the legs define a polyhedral volume having a base defined by the distal ends of the legs and an apex defined by the intersection of the longitudinal axes of the legs in the deployed position.

The camera support frame further includes an arm extendable from the bracket along the central axis of the bracket, the arm having proximal and distal ends with a second articulating joint connecting the proximal end of the arm to a bracket such that the distal end of the arm may be swiveled through an arc of at least ninety degrees, the arc having a center at the proximal end of the arm. A third articulating joint is provided at the distal end of the arm for connecting a camera or camera mounting assembly thereto.

A battery box mounted on the distal end of the arm includes opposed, first and second substantially parallel side walls, opposed first and second substantially parallel end walls, and opposed, substantially parallel top and bottom walls extending between the parallel first and second side walls. The parallel first and second end walls are joined thereto along the edges thereof whereby the first and second substantially parallel side walls, the first and second end walls and the top and bottom walls defining a parallelepiped cavity for receiving one or more batteries or a power pack. The bottom wall of the battery box is connected to the distal end of the arm with the third articulating joint such that the battery box is swivable around the distal end of the arm through an arc of at least ninety degrees relative to the arm such that the battery box swivels at least ninety degrees relative to the longitudinal axis of the arm.

A camera support base is mounted on the top wall of the battery box between the first and second side walls and the opposed, first and second substantially parallel first and second end walls of the battery box. The camera support base includes a circular top wall joined at an upper edge thereof that extends circumferentially around a generally circular outer perimeter defined by a circular top wall. A tubular shaft receiving support is rigidly connected to the camera support base and extends perpendicular to the base. A proximal portion of a camera mounting shaft is disposed in the tubular shaft receiving support with the camera support shaft extending axially from the top wall of the camera support base. A swivel or ball type joint is connected to the cylindrical shaft for mounting a wireless camera such that the camera may be rotated relative to a longitudinal axis of the tubular shaft.

In yet another aspect, a display positioner includes a generally rectangular adapter base secured to the top wall of the battery box and a display arm having proximal and distal ends with a shaft portion extending between the ends of the arm. A swivel joint is provided for connecting the proximal end of the display arm to the adapter base such that the distal end of the display arm is rotatable around the proximal end of the arm. An adjustable joint at the distal end of the display arm connects the display arm to a display adapter configured to receive and retain a display device having a flat screen with the flat screen oriented away from the display arm. The display device may be a smart phone, a tablet computer or a similar device and may have audio and video transmission capability. A pair of retainers may be provided for connecting the display device to the display adapter. In one variation, the retainers are configured to engage opposed parallel edges of the display device.

In yet another aspect, a tubular arm support is affixed to the mobile cart. The tubular arm support has an open upper end, a closed lower end and a hollow tube extending between the upper and lower ends. The tubular arm support has a longitudinal axis and an inside diameter greater than the distance between the outermost edges of the legs of the camera support in the collapsed position. This allows the legs of the camera support to be received in the tubular arm support.

An adjustable light unit may be provided in some variations. The adjustable light unit includes a hollow flexible neck having a proximal end affixed to the top wall of the battery box and a distal end. A light is connected to the distal end of the hollow flexible neck whereby the adjustable light unit may be positioned to illuminate an area within the field of view of the camera. One or more batteries positioned inside the battery box may be used to power the camera, light and display device.

BRIEF DESCRIPTION OF THE DRAWINGS

For a more complete understanding, reference is now made to the following description taken in conjunction with the accompanying drawings in which.

DETAILED DESCRIPTION

Figure 1:
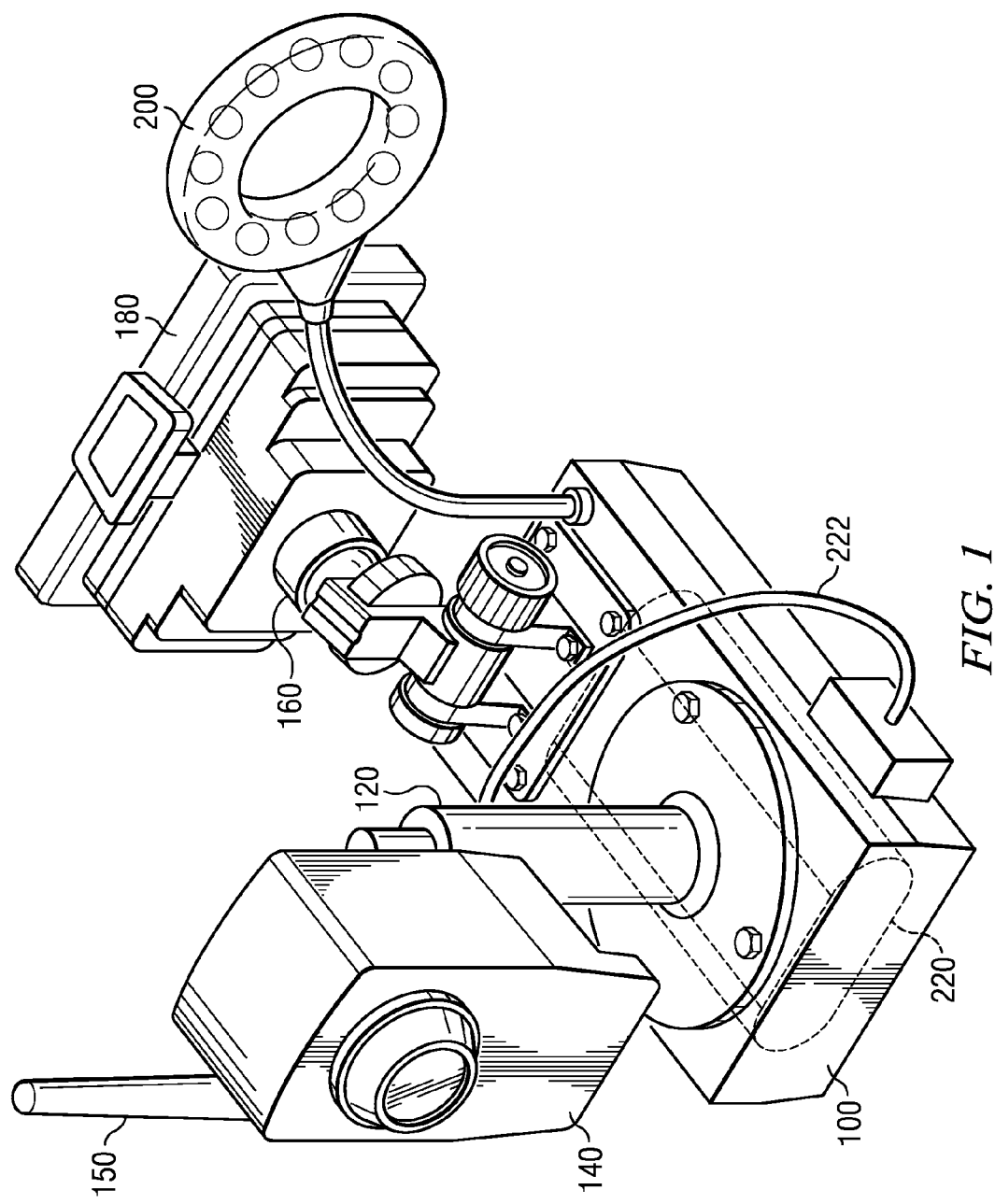
FIG. 1 is a first perspective view of a camera, camera adapter and related equipment according to the disclosure.

Referring now to the drawings, wherein like reference numbers are used herein to designate like elements throughout, the various views and embodiments of a remote camera and adapter therefor are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 2:
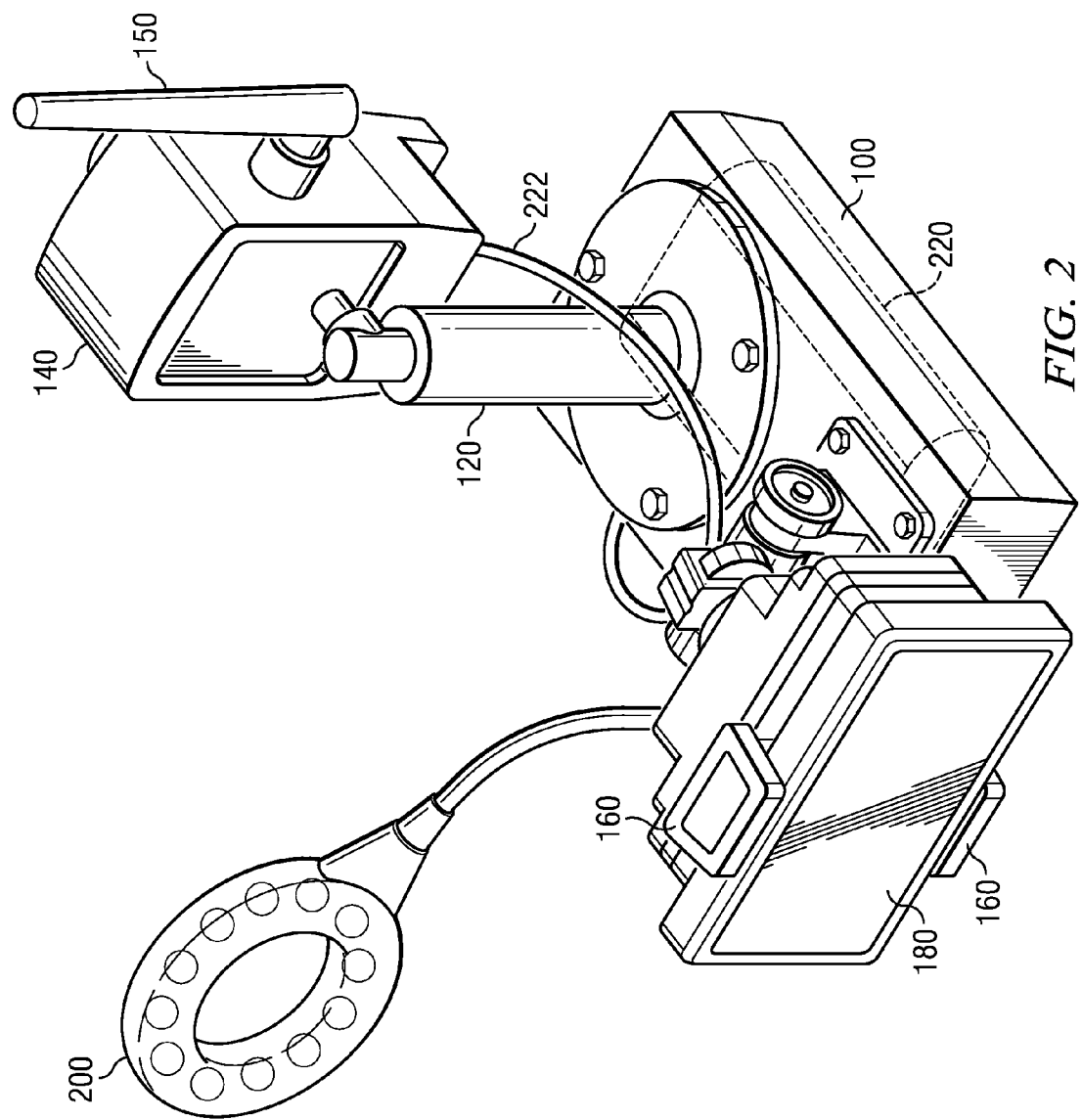
FIG. 2 is a second perspective view of a camera, a camera adapter and related equipment according to the disclosure.

FIGS. 1 and 2 are perspective views of a portable wireless camera apparatus including a frame 100; a wireless camera adapter 120 mounted to the frame and configured for attaching a wireless camera. In one embodiment, frame 100 comprises a battery box for storing one or more batteries or a rechargeable power pack to provide electrical power to a camera, light or other electrically powered device. A wireless camera 140 includes an imaging system, built-in wireless communications and an antenna 150 attached to the wireless camera adapter. A monitor adapter 160 is mounted to the frame 100 and configured for attaching a monitor/display 180 to the monitor adapter. A light 200 is mounted on the frame 100 and a battery or power pack 220 is mounted in the frame for providing power to the wireless camera 140, monitor 180 and/or light 200. One suitable power pack is the Energizer XPOO. The wireless camera 140 receives power from battery or power pack 220. One wireless camera suitable in some applications is the AXIS 207MW network camera. A surveillance controller, such as the 4U Rackmount IP-based Server manufactured by ExacqVision, may be used in conjunction with the wireless camera 140. The monitor/display 180 may be a smart phone such as an iPhone capable of receiving video or audiovisual data from Wi-Fi or wireless data networks such as EDGE, 3G, 4G, LTE, etc. Wireless camera 140, monitor/display 180 and light 200 may receive power from the battery or power pack 220. A power/data cable 222 provides electrical power and a data link for wireless camera 140.

Figure 3:
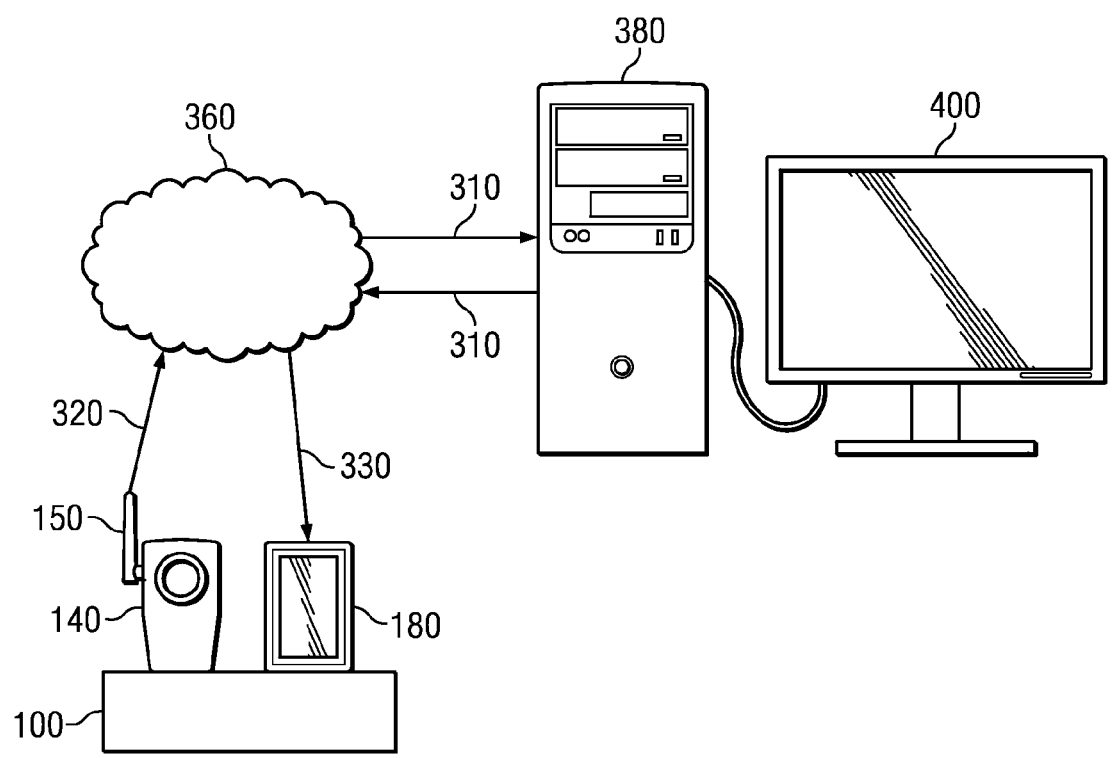
FIG. 3 is a block diagram illustrating one example of a video or audiovisual data stream from a camera transmitted via an antenna across a wireless link and data network according to the disclosure.

FIG. 3 is a block diagram illustrating one example of a video or audiovisual data stream from the wireless camera 140 transmitted via the antenna 150 across a wireless link 320 and data network 360 (such as a global computer network) to a remote device 380 (i.e., computer terminal, PDA, smart phone or similar device) for viewing on remote display 400. The monitor/display 180 receives and displays a visual or audiovisual data stream from the remote device 380 via the data network 360 and a wireless link 320. The data links 310, 320 and 330 between the data network 360, the remote device 380, wireless camera 140 and monitor/display 180 may be wireless or wired. Thus, there need not be a direct data link between the wireless camera 140 and the monitor/display 180, and the image displayed on monitor/display 180 is the same as displayed on remote device 400, thereby providing feedback to the operator of the portable wireless camera. An apparatus configured to support a wireless camera 140 and monitor/display 180 includes a frame 100, the wireless camera adapter 120, the monitor adapter 160, the light 200 and the battery or power pack 220.

Figure 4:
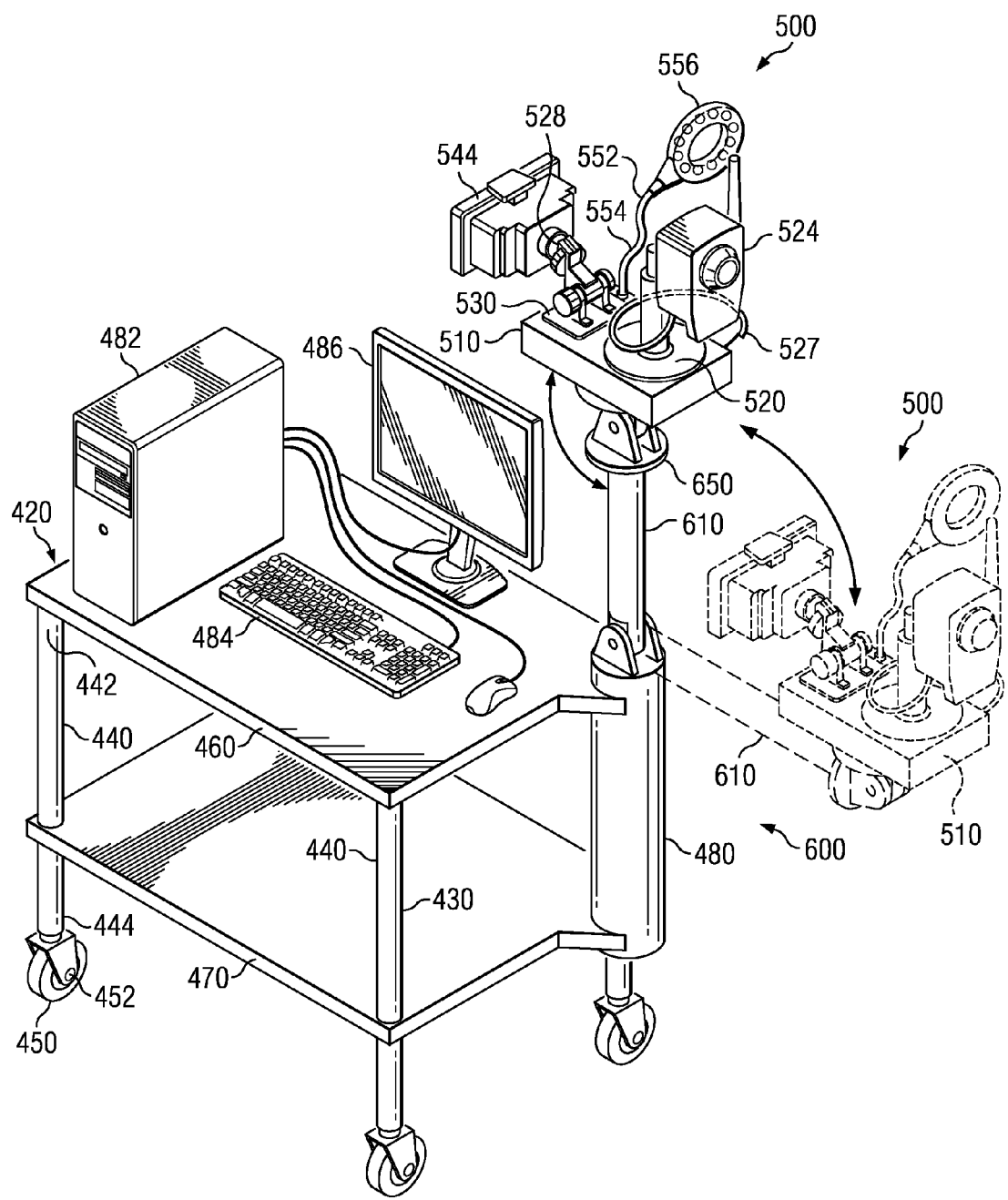
FIG. 4 is a partial perspective view of a mobile cart configured with a camera, a camera adapter and related equipment according to the disclosure.

FIG. 4 is a side view of a mobile ("crash") cart 420 suitable for use for servicing computer servers at a location remote from a central data processing center. Mobile cart 420 could, of course, be used in a central processing facility to facilitate communications with individuals at locations remote from the facility. As illustrated, mobile cart 420 includes a support frame 430, the support frame including four cylindrical, vertically oriented, support members 440, each having an upper end 442 and a lower end 444. Support members 440 may be tubular; for example, a cylindrical or polygonal tube or have an L, C, Z etc., shaped cross-section. Support members 440 each have a longitudinal axis and are secured relative to each other such that the four axes of the members are substantially parallel so as to define an equiangular parallelogram having diagonals of equal length between diametrically opposed members. A wheel member 450 is attached to the lower end of each of the support members to facilitate movement of the crash cart 420 to a desired location adjacent a server. Each wheel member 450 includes an axle member 452 having a longitudinal axis about which the wheel member 450 is configured to rotate. The longitudinal axis of each of the wheel members is substantially perpendicular to longitudinal axes of the cylindrical support members 440.

Crash cart 420 has a first support platform 460 extending between the vertical support members 440 along a first plane that extends perpendicular to the longitudinal axes of the cylindrical support members and is defined by the vertices of the substantially equiangular parallelogram and by a predetermined height (e.g., distance from) from the lower ends 444 of the vertically oriented, cylindrical support members. Similarly, a second support platform 470 extends in a second plane defined by the vertices of the substantially equiangular parallelogram, and by a predetermined second height from the lower ends 444 of the vertically oriented, cylindrical support members 440. As illustrated, second support platform 470 is positioned between first support platform 460 and lower ends 444 of support members 440. First support platform 460 and second support platform 470 are each affixed to the four vertically oriented, support members 440 so as to define a hexahedral volume between the first support platform and the second support platform within four vertically oriented, cylindrical support members. The hexahedral volume has rectangular congruent faces coextensive with four planes defined by the longitudinal axes of the vertically oriented, cylindrical support members and the two planes defined by the first and second support platforms.

As illustrated, a computer 482, keyboard or other user interface 484 and monitor 486 are mounted or positioned on crash cart 420. In one variation, monitor 486 may be a graphical user interface e.g., a touch screen device. Computer 482 may be configured to communicate with other equipment such as computer servers with a wired or wireless connection. Computer 482 may also be configured to communicate with a wireless camera 524 such that images from the camera may be displayed, used for diagnostic analysis, transmitted to a remote location and/or stored for future reference.

Figure 5:
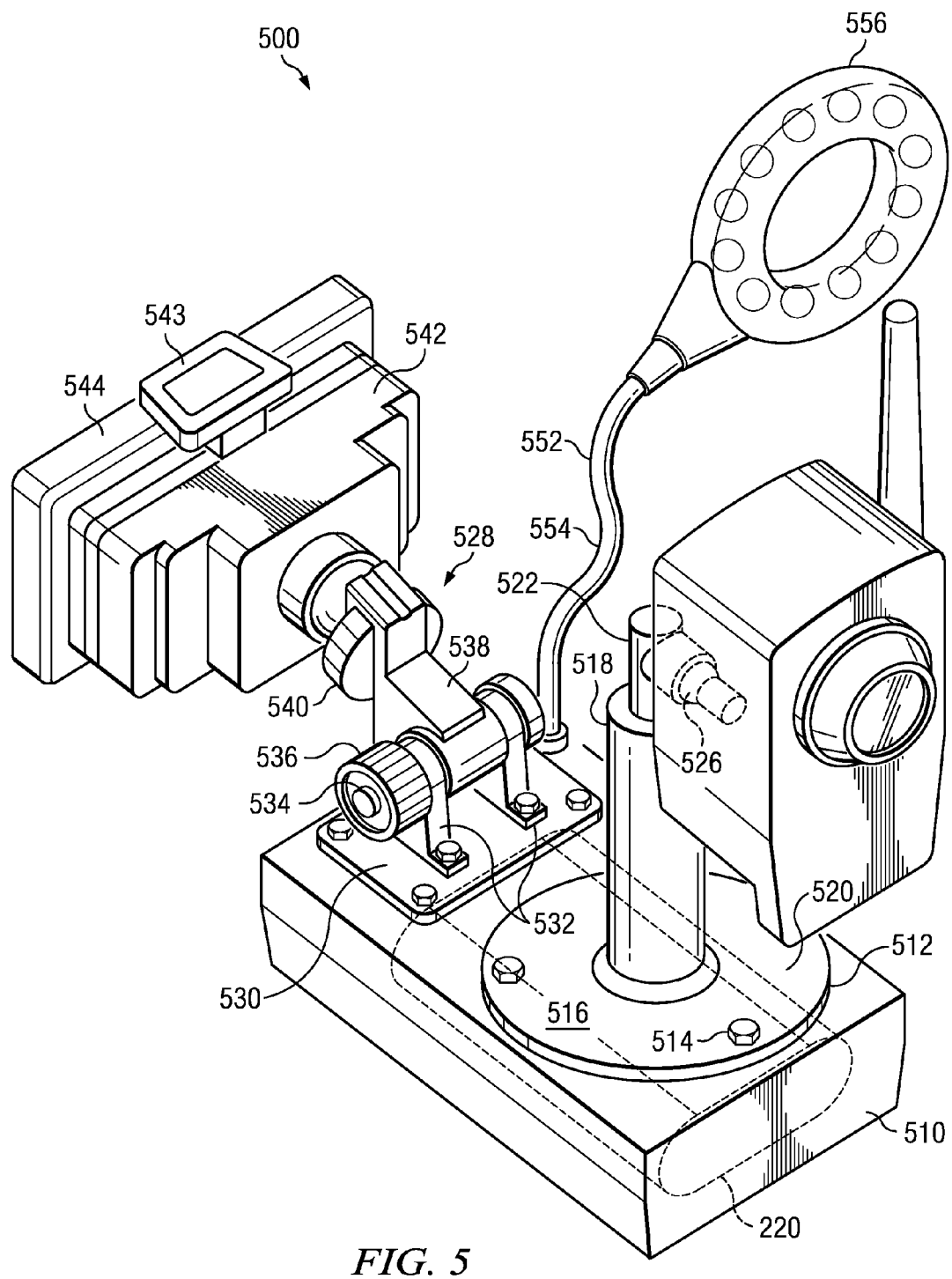
FIG. 5 is a partial perspective top view of a camera, a camera adapter and related equipment according to the disclosure.

FIG. 5 is a partial perspective top view of a camera, a camera adapter and related equipment as disclosed herein. Referring to FIGS. 4 and 5 in conjunction, a mounting adapter 500 for a wireless camera 524 suitable for use with a crash cart 420 includes a battery box 510 having opposed first and second substantially parallel side walls and opposed first and second substantially parallel end walls. Top and bottom walls extend between the parallel first and second side walls and the parallel first and second end walls. The first and second substantially parallel side walls, the first and second end walls and the top and bottom walls are joined along edges thereof to form a parallelepiped cavity for receiving one or more batteries or a power pack 220.

In one variation, battery box 510 is mounted on the distal end of an articulating camera support 600 (FIG. 4) which is retained in a tubular arm support 480 (FIG. 4) affixed to crash cart 420. Tubular arm support 480 has an open upper end, a closed lower end with a hollow tube extending therebetween that defines a longitudinal axis and an inside diameter. Tubular arm support 480 may be affixed to crash cart 420 such that the longitudinal axis of the tubular arm support extends substantially parallel to the longitudinal axes of the four vertically oriented, cylindrical support members 440. The top and bottom ends of tubular arm support along with the inside diameter and longitudinal axis thereof define a cylindrical arm receiving volume wherein at least a portion of articulating camera support 600 may be received.

A camera support base 520 is positioned on the top wall of the battery box 510 between the first and second side walls and the opposed, first and second substantially parallel end walls of the battery box. As illustrated, camera support base 520 is located adjacent one of the first and second substantially parallel end walls of camera box 510. Camera support base 520 includes a circular top wall 516 (FIG. 5) that defines a circular footprint on the top wall of battery box 510. A side wall extends circumferentially around a generally circular outer perimeter defined by circular top wall 516 and is joined along an upper edge thereof. First, second and third screw receiving apertures 514 are positioned adjacent the circular outer perimeter and extend vertically into the generally circular top wall of the top wall of camera mounting base 512. First, second and third screw receiving apertures 514 are spaced apart at equal circumferential intervals around the generally circular outer perimeter of the circular top wall such that camera mounting base 512 may be secured to battery box 510 with screws or similar fasteners.

A tubular shaft receiving support 518 (FIG. 5) extends perpendicular to camera mounting base 512. Tubular shaft receiving support 518 extends axially from the center of camera mounting base 512 and is rigidly secured to the base by welding, with an adhesive or by other suitable means. A proximal portion of a camera support shaft 522 is disposed in shaft receiving support 518 with a distal portion of the shaft extending from shaft receiving support 518 for mounting wireless camera 524. As illustrated, tubular shaft receiving support 518 and camera support shaft 522 have generally cylindrical geometries, however shaft receiving support 518 and camera support shaft 522 may have cross-sectional geometries other than circular, for example, camera support shaft 522 may be a tube having a polygonal cross-section, a "Z" or "C" cross-section or another geometric configuration. Also, as illustrated, a proximal portion of camera support shaft 522 is disposed in tubular shaft receiving support 518, however in different embodiments, a tubular camera support shaft 522 may have an inside diameter or other cross-sectional dimension such that a proximal portion of the shaft may be disposed with a distal portion of tubular shaft receiving support 518 inside the shaft.

As illustrated, wireless camera 524 is mounted on a camera support shaft 522 with a ball or swivel joint 526 that enables rotation of the camera through at least one of about ninety degrees relative to a longitudinal axis of the shaft. In an embodiment where joint 526 is a ball joint, a greater range of motion is provided. One suitable wireless camera is the AXIS 207MW wireless network camera. One or more electrical leads 527 (FIG. 4) may be provided to supply power to wireless camera 524 from battery or power pack 220. Other cables (not shown) for supplying power and/or a data link may be utilized to provide power and/or a data link to display device 544, camera 524 and light unit 552. Wireless camera 524 is adjustably mounted on camera support shaft 522 with a ball or similar joint 526, enabling a technician to orient the camera as desired to capture images of an area or device of interest for transmission to a remote location.

Referring still to FIGS. 4 and 5, a display positioner 528 is mounted on the upper or top wall of battery box 510. Display positioner 528 includes a generally rectangular adapter base 530 secured to battery box 510 adjacent to camera mounting base 512 and adjacent to a second selected one of the first and second substantially parallel first and second end walls of battery box 510 and between the sidewalls of the battery box 510.

Adapter base 530 includes opposed, parallel first and second brackets 532 extending perpendicular to the top wall of battery box 510. First and second brackets 532 each define generally circular apertures extending through the brackets that share a common axis extending through the generally circular apertures, the common axis extending parallel to the top wall of battery box 510, the apertures being configured to receive a cylindrical shaft 534 that extends therethrough. Cylindrical shaft 534 has opposed first and second ends thereof and a central axis co-extensive with the common axis of first and second circular apertures of the mounting brackets 532. A manual rotary adjustment mechanism 536 is affixed to the first end of the generally cylindrical shaft 534.

Display positioner 528 further includes a display arm 538 having proximal and distal ends with a shaft portion extending between the ends of the display arm. The shaft portion has a longitudinal axis that extends perpendicular to the common axis of the circular apertures of first and second mounting brackets 532. The proximal end of display arm 538 is connected to the base with a swivel joint that enables the distal end of display arm 538 to be pivoted through at least one arc of at least forty five degrees. The swivel joint includes a cylindrical shaft receiving channel that has first and second ends and a longitudinal pivot axis extending co-extensive with the central axis of the generally cylindrical shaft 534 and with the common axis of the first and second circular apertures of the mounting brackets 532. The cylindrical shaft receiving channel is configured to receive cylindrical shaft 534 rotatably within the channel such that the distal end of display arm 538 may travel through an arc defining a plane perpendicular to the top wall of battery box 510 and parallel to the sidewalls of the battery box. The arc has an axis co-extensive with a central axis of cylindrical shaft 534 and the common axis of the first and second circular apertures of mounting brackets 532.

A display adapter 542 is coupled to display arm 538 with an adjustable joint 540 at the distal end of the arm. Display adapter 542 is configured to receive and retain a display device 544 including a flat screen display such that the display device may be positioned along at least one arc corresponding to an arc traveled by the distal end of shaft to orient for viewing an image corresponding, at least in part, to an image captured by a camera mounted on camera support shaft 522. Display adapter 542 is configured to retain display device 544 in one or more positions, wherein the flat screen of the display device is oriented away from adjustable joint 540 and display arm 538. In one embodiment, adjustable joint 540 is a ball joint. In another embodiment, adjustable joint 540 is a swivel joint that permits movement of display adapter 542 along a single or multiple arcs. In different embodiments, display adapter 542 may include one or more retainers 543 connected to the display adapter and configured to grasp opposed edges of a display device 544. In the illustrated embodiment, two opposed retainers 543 are connected to display adapter 542 and positioned to engage opposed parallel edges of a display device 544. Display device 544 may be a smart phone, tablet-type device such as an iPad or other device capable of receiving video or audiovisual data from Wi-Fi or wireless data networks such as EDGE, 3G, 4G or a similar network. In some embodiments, display device 544 is configured for wired or wireless audio and video transmission to facilitate communications between an individual at crash cart 420 and an individual at a remote location.

In some instances, the ambient light in a given area within the field of view of wireless camera 524 will be insufficient to enable the camera to transmit an acceptable image of a device or area of interest. To provide sufficient illumination, an adjustable light unit, such as gooseneck light unit 552, is affixed to the top wall of battery box 510. Gooseneck light unit 552 includes a hollow flexible neck 554 through which power is supplied to a circular light or light bulb 556 via an electrical cable extending through the neck from battery box 510 to light bulb 556.

Gooseneck light unit 552 may be battery powered, thereby eliminating the need for a power connection. Flexible neck 554 has a proximal end affixed to the battery box 510 and a distal end. Circular light 556 is affixed to the distal end of the neck whereby flexible neck 554 of gooseneck light unit 552 may be adjusted to position the light to illuminate a device or area of interest so that the camera can record and transmit images to a remote location such as a central data processing facility or office to enable monitoring at the remote location. In one embodiment, flexible neck 554 is laterally and vertically adjustable such that the range of motion of circular light 556 corresponds to a hemisphere having a center at the proximal end of flexible neck 554 and a central axis extending through the proximal end of flexible neck 554 perpendicular to the top wall of battery box 510. In the same or a different embodiment, circular light 556 may be rotatable around the distal end of flexible neck 554 to provide more adaptability. In other embodiments, light sources other than a gooseneck light may be utilized. For example a light mounted on a fixed bracket with or without a swivel connection to the bracket or other directionally adjustable light fixture or device may be employed.

Figure 6:
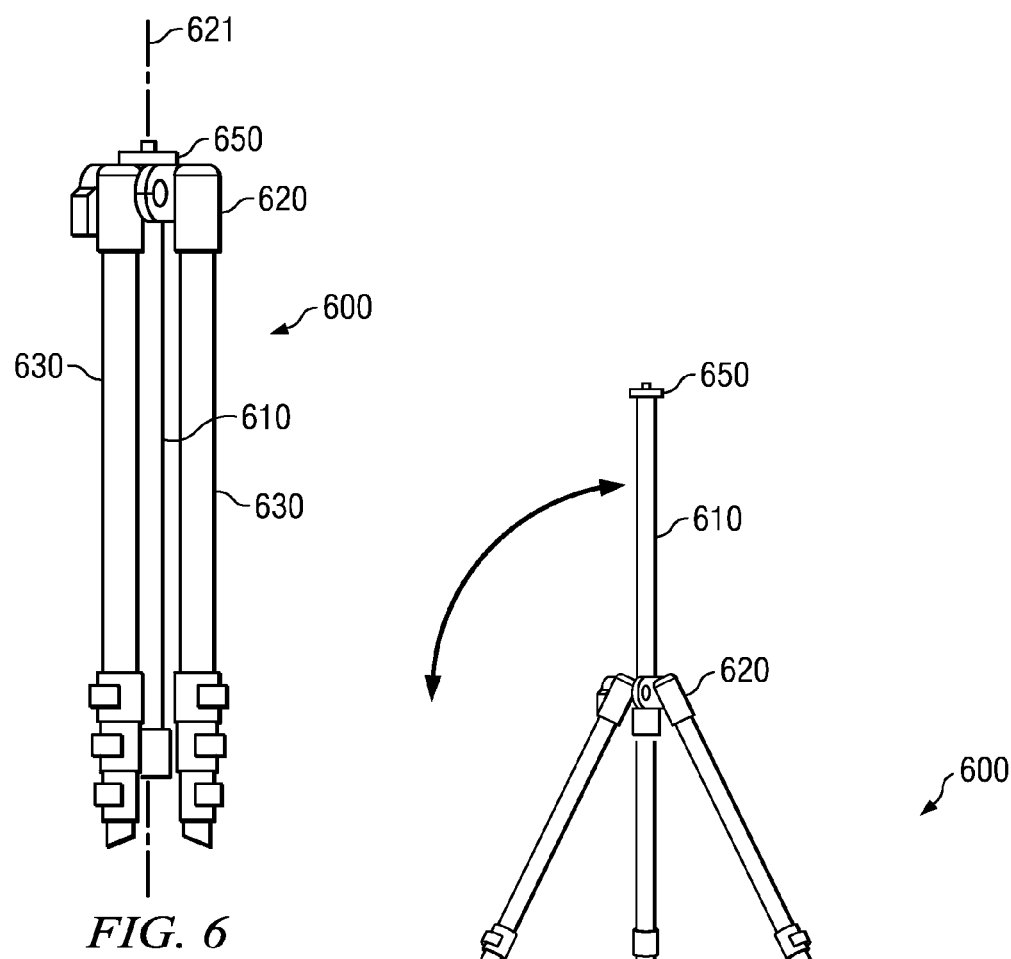
FIG. 6 is a side view of a camera support in a deployed configuration according to the disclosure.
Figure 7:
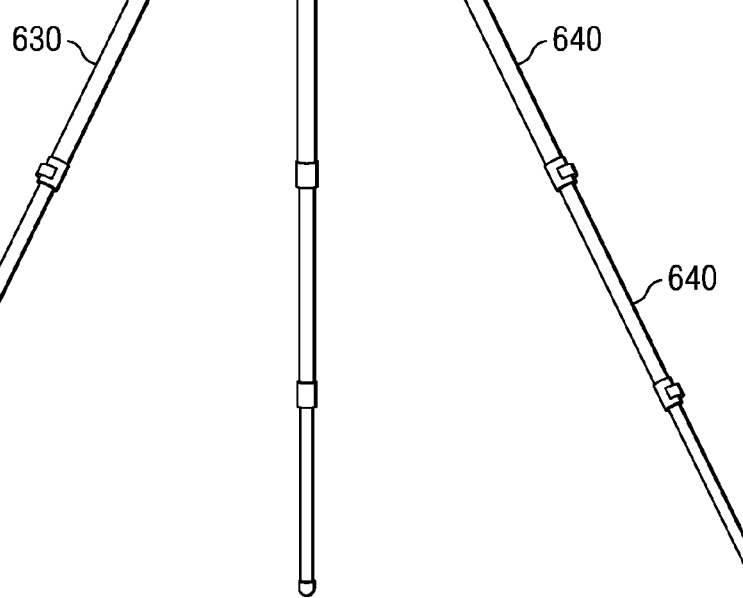
FIG. 7 is a side view of the camera support of FIG. 6 in a collapsed position.

FIGS. 6 and 7 are side views of camera support frame 600 in collapsed and fully deployed positions, respectively. Referring to FIGS. 4, 6 and 7, camera support frame 600 includes an articulating arm 610 connected to a bracket 620. As illustrated, bracket 620 has a central axis 621 extending substantially parallel to legs 630 when the legs are in the collapsed position illustrated in FIG. 6. When extended from bracket 620, articulating arm 610 may be swiveled approximately ninety degrees relative to bracket 620. Three telescoping legs 630 each have a proximal end and a distal end with the proximal ends of the legs being connected to bracket 620 such that the legs can swivel and extend from a retracted position as illustrated in FIG. 6 to a deployed position as illustrated in FIG. 7. Each of the legs 630 includes one or more telescoping sections 640 such that the legs may be extended from the retracted position illustrated in FIG. 6 to the deployed position shown in FIG. 7.

Telescoping sections 640 may be provided with clamps or similar fastening devices to secure the telescoping section in place when legs 630 are extended from the retracted position. In one embodiment, articulating arm 610 may be collapsed through a hole centrally located in bracket 620 between legs 630 to the position illustrated in FIG. 6. Articulating arm 610 may be provided with a ball joint, swivel joint or other connecting device to attach a device such as battery box 510 to distal end of the arm. When articulating arm 610 is extended upwardly through the hole, the arm may be swiveled through an arc, for example, ninety or one hundred and eighty degrees and locked in position with a clamp, cam or similar restraining mechanism. In yet other variations, articulating arm 610 may be constructed from telescoping sections such that the range of movement of the arm is increased.

Referring to FIGS. 4 and 6, the radial distance between the center of bracket 620 and the outermost edges of legs 630 with the legs in the retracted position (FIG. 6) is less than one-half of the inside diameter of tubular arm support 480 (FIG. 4). Thus, to deploy camera support 600 on crash cart 420, legs 630, in the retracted position, are inserted into tubular arm support 480. In this manner, camera support 600 may be retained in tubular arm support 480 without the need for fasteners such as screws, bolts, bands, retainers etc., and removed from the cart to deploy the support and battery box 510 along with wireless camera 524, display device 544 and gooseneck light unit 552 without disengaging any fasteners or fastening devices. One support apparatus suitable for use in connection with the system described herein is illustrated and described in U.S. Pat. No. 7,229,053 to Speggiorin, issued Jun. 12, 2007, the disclosure of which is incorporated herein for all purposes.

Referring again to FIG. 4, battery box 510 is mounted on the distal end of articulating arm 610 of camera support frame 600 with an articulating connection or joint 650 that allows the battery box to be swiveled ninety degrees relative to the longitudinal axis of articulating arm 610. Further, articulating arm 610 can also be swiveled ninety degrees from a substantially vertical orientation to a substantially horizontal orientation. Thus, articulating arm 610 can be swiveled from a substantially vertical orientation to a substantially horizontal orientation, extending the arm and battery box 510 from crash cart 420 while battery box 510 may be simultaneously swiveled ninety degrees to maintain camera wireless 524 in a horizontally oriented position. As illustrated, camera support frame 600 is retained in tubular arm support 480 with legs 630 extending into the tubular support. Camera support frame 600 may be removed from tubular arm support 480 so that wireless camera 524 may be deployed independently of crash cart 420.

It will be appreciated by those skilled in the art having the benefit of this disclosure that this remote camera and adapter therefor provides a camera system for use with a mobile crash cart used for diagnosis and repair of computers and related equipment. It will be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An adapter for deploying a wireless camera, comprising:
 a camera support frame including:
  a bracket having a central axis;
  a plurality of collapsible legs, each of the legs having a proximal end connected to the bracket with a first articulating joint that permits the leg to be swiveled outwardly from the bracket, each of the legs including a plurality of telescoping sections and lockable joints disposed between the telescoping sections such that each leg may be extended from a collapsed position having a first length wherein the telescoping sections of the leg are retracted and the leg is substantially parallel to the central axis of the bracket to a deployed position wherein the leg is swiveled outwardly from the central axis and wherein the telescoping sections of the leg are extended and locked with the lockable joints, whereby the legs in the deployed position have a second length, the second length being greater than the first length, and define a polyhedral volume having a base defined by the distal ends of the legs and an apex defined by the intersection of the longitudinal axes of the legs in the deployed position;
  an arm extendable from the bracket along the central axis of the bracket, the arm having a longitudinal axis, a proximal end and a distal end;
  a second articulating joint connecting the proximal end of the arm to the bracket such that the distal end of the arm may be swiveled through an arc of at least ninety degrees, the arc having a center at the proximal end of the arm;
  a third articulating joint connected to the distal end of the arm;
 a battery box having opposed, first and second substantially parallel side walls, opposed first and second substantially parallel end walls, opposed, substantially parallel top and bottom walls extending between the parallel first and second side walls and the parallel first and second end walls and joined thereto along the edges thereof whereby the first and second substantially parallel side walls, the first and second end walls and the top and bottom walls defining a parallelepiped cavity for receiving a one or more batteries or a power pack, wherein the bottom wall of the battery box is connected to the distal end of the arm with the third articulating joint whereby the battery box is moveable through an arc of at least ninety degrees relative to the longitudinal axis of the arm;
 a camera support base mounted on the top wall of the battery box between the first and second side walls and the opposed, first and second substantially parallel first and second end walls of the battery box, the camera support base including a circular top wall and a side wall joined at an upper edge thereof to the top wall and extending circumferentially a generally circular outer perimeter defined by the circular top wall;
 a tubular shaft receiving support rigidly connected to the camera support base and extending perpendicular to the base and a camera support shaft having a first end disposed in the tubular shaft receiving support, the camera support shaft extending axially away from the top wall of the camera support base;
 a swivel joint connected to a second end of the camera support shaft;
 a wireless camera transmitting audiovisual data across a first wireless link to a data network, the wireless camera being connected to the camera support shaft with the swivel joint whereby the camera may be rotated relative to a longitudinal axis of the tubular shaft; and
 a display positioner mounted on the top wall of the battery box, the display positioner including:
  a generally rectangular adapter base secured to the top wall of the battery box;
  a display arm having proximal and distal ends with a shaft portion extending between the ends thereof;
  a swivel joint connecting the proximal end of the display arm to the adapter base whereby the distal end of the display arm is rotatable around the proximal end of the arm; and
  an adjustable joint at the distal end of the display arm and
 a display adapter connected to the display arm with the adjustable joint wherein the display adapter is configured to receive and removably retain a smart phone capable of receiving audiovisual data via a second wireless link from the data network and having a flat screen oriented away from the display arm whereby the smart phone, when retained in the display adapter, is rotatable and adjustable relative to the top wall of the battery box; and whereby the smart phone, when retained in the display adapter, receives and displays audiovisual data received from the data network via the second wireless link, which audiovisual data is identical to the audiovisual data transmitted to the data network by the wireless camera on the first wireless link, and wherein there is no direct audiovisual data link between the wireless camera and the smart phone.

2. The adapter for deploying a wireless camera of claim 1 further comprising:

an adjustable light unit, the adjustable light unit including a hollow flexible neck having a proximal end affixed to the top wall of the battery box and a distal end; and a light connected to the distal end of the hollow flexible neck whereby the adjustable light unit may be positioned to illuminate an area within the field of view of the camera.

3. The adapter for deploying a wireless camera of claim 1 further comprising:

a pair of retainers connected to the display adapter, the retainers configured to engage opposed parallel edges of the smart phone such that the flat screen of the smart phone is oriented away from the display arm.

4. The adapter for deploying a wireless camera of claim 1 further comprising:

one or more batteries positioned inside the battery box; and a power cable connected to the battery and to the camera for supplying electrical power to the camera.

5. The adapter for deploying a wireless camera of claim 1 further comprising:

a power cable connected to the battery and to the smart phone for supplying electrical power to the smart phone.

6. A mobile cart and adapter for deploying a wireless camera, comprising:

a mobile cart including a support frame having:

at least four cylindrical, vertically oriented, support members, each of the support members having an upper end and a lower end and a longitudinal axis;

a wheel member connected to the lower end of each of the support members, each wheel member having an axle member having a longitudinal axis around which the wheel member is configured to rotate wherein the longitudinal axis of each of the wheel members is substantially perpendicular to longitudinal axes of the cylindrical support members;

a first support platform extending between the vertical support members along a first plane that extends perpendicular to the longitudinal axes of the cylindrical support members;

a second support platform extending in a second plane between first support platform the lower ends of the support members and wherein the first support platform and second support platform are each affixed to the four vertically oriented, support members so as to define a hexahedral volume between the first support platform and the second support platform within four vertically oriented, cylindrical support members, the hexahedral volume having rectangular congruent faces coextensive with four planes defined by the longitudinal axes of the vertically oriented, cylindrical support members and the two planes defined by the first and second support platforms;

a camera support frame including:

a bracket having a central axis;

a plurality of collapsible legs, each of the legs has a proximal end connected to the bracket with a first articulating joint that permits the leg to be swiveled outwardly from the bracket, each of the legs including a plurality of telescoping sections and lockable joints such that each leg may be extended from a collapsed position wherein the telescoping sections of the leg are retracted and the leg is substantially parallel to the central axis of the bracket to a deployed position wherein the leg is swiveled outwardly from the central axis and wherein the telescoping sections of the leg are extended and locked with the lockable joints;

an arm extendable from the bracket along the central axis of the bracket, the arm having a proximal and distal ends, a second articulating joint connecting the proximal end of the arm to the bracket such that the distal end of the arm may be swiveled through an arc of at least ninety degrees, the arc having a center at the proximal end of the arm;

a third articulating joint connected to the distal end of the arm;

a battery box having opposed, first and second substantially parallel side walls, opposed first and second substantially parallel end walls, opposed, substantially parallel top and bottom walls extending between the parallel first and second side walls and the parallel first and second end walls and joined thereto along the edges thereof whereby the first and second substantially parallel side walls, the first and second end walls and the top and bottom walls defining a parallelepiped cavity for receiving a one or more batteries or a power pack, wherein the bottom wall of the battery box is connected to the distal end of the arm with the third articulating joint such that the battery box is moveable through an arc of at least ninety degrees relative to the longitudinal axis of the arm;

a camera support base mounted on the top wall of the battery box between the first and second side walls and the opposed, first and second substantially parallel first and second end walls of the battery box, the camera support base including a circular top wall and a side wall joined at an upper edge thereof to the top wall and extending circumferentially a generally circular outer perimeter defined by the circular top wall;

a tubular shaft receiving support rigidly connected to the camera support base and extending perpendicular to the base and a camera support shaft having a first end disposed in the tubular shaft receiving support, the camera support shaft extending axially away from the top wall of the camera support base;

a swivel joint connected to a second end of the camera support shaft;

a wireless camera transmitting audiovisual data across a first wireless link to a data network, the wireless camera being connected to the shaft with the swivel joint whereby the camera may be rotated relative to a longitudinal axis of the of the tubular shaft; and a display positioner mounted on the top wall of the battery box, the display positioner including:

a generally rectangular adapter base secured to the top wall of the battery box;

a display arm having proximal and distal ends with a shaft portion extending between the ends thereof;

a swivel joint connecting the proximal end of the display arm to the adapter base whereby the distal end of the display arm is rotatable around the proximal end of the arm;

an adjustable joint at the distal end of the display arm and
a display adapter connected to the display arm with the adjustable joint wherein the display adapter is configured to receive and removably retain a smart phone capable of receiving audiovisual data via a second wireless link from the data network and having a flat screen oriented away from the display arm whereby the smart phone, when retained in the display adapter, is rotatable and adjustable relative to the top wall of the battery box; and
whereby the smart phone, when retained in the display adapter, receives and displays audiovisual data received from the data network via the second wireless link, which audiovisual data is identical to the audiovisual data transmitted to the data network by the wireless camera on the first wireless link, and wherein there is no direct audiovisual data link between the wireless camera and the smart phone; and
a tubular arm support affixed to the mobile cart, the tubular arm support having an open upper end, a closed lower end and a hollow tube extending therebetween, the tubular arm support having a longitudinal axis and an inside diameter greater than the distance between the outermost edges of the legs of the camera support in the collapsed position whereby the legs of the camera support are received in the tubular arm support.

7. The mobile cart and adapter for deploying a wireless camera of claim 6, wherein the legs of the camera support frame in the deployed position define a polyhedral volume having a base defined by the distal ends of the legs and an apex defined by the intersection of the longitudinal axes of the legs in the deployed position.

8. The mobile cart and adapter for deploying a wireless camera of claim 6 further comprising:
an adjustable light unit, the adjustable light unit including a hollow flexible neck having a proximal end affixed to the top wall of the battery box and a distal end; and
a light connected to the distal end of the hollow flexible neck whereby the adjustable light unit may be positioned to illuminate an area within the field of view of the camera.

9. The mobile cart and adapter for deploying a wireless camera of claim 6 further comprising a pair of retainers connected to the display adapter, the retainers configured to engage opposed parallel edges of the smart phone whereby the flat screen of the display device smart phone is oriented away from the display arm.

10. The mobile cart and adapter for deploying a wireless camera of claim 6, wherein the first support platform and second support platform define a hexahedral volume between the first support platform and the second support platform within four vertically oriented, cylindrical support members, the hexahedral volume having rectangular congruent faces coextensive with four planes defined by the longitudinal axes of the vertically oriented, cylindrical support members and two planes defined by the first and second support platforms.

* * * * *